July 14, 1942.    C. B. DALZELL ET AL    2,289,632
SANITARY VALVE
Filed May 18, 1939
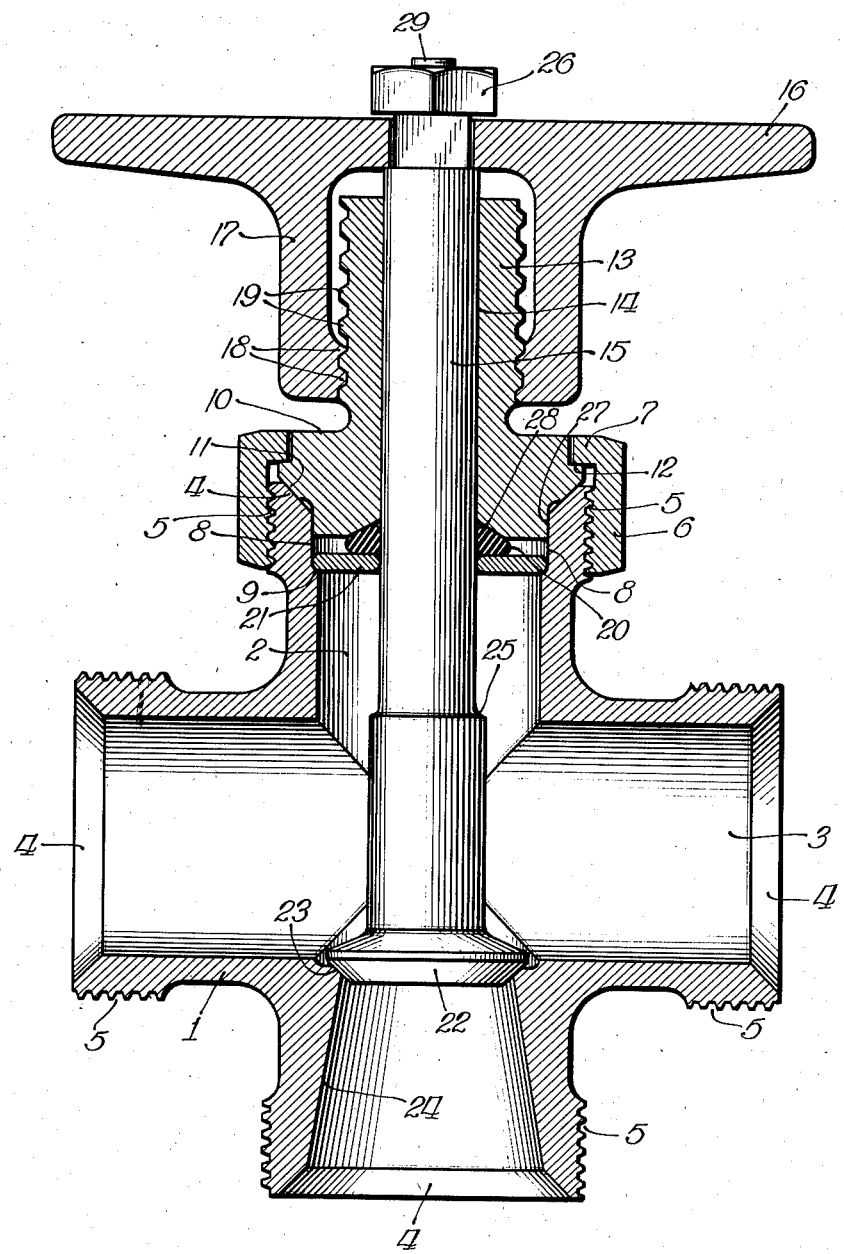
INVENTOR.
Charles B. Dalzell
BY  Harold W. Cheney
Norman E. H. Heletzke
ATTORNEY.

Patented July 14, 1942

2,289,632

UNITED STATES PATENT OFFICE 2,289,632

SANITARY VALVE

Charles B. Dalzell and Harold W. Cheney, Little Falls, N. Y., assignors to Cherry-Burrell Corporation, Wilmington, Del., a corporation Application May 18, 1939, Serial No. 274,409

7 Claims. (Cl. 251—50)

This invention relates to valves adaptable for the regulation of the flow of liquid and more particularly to sanitary valves such, for example, as valves commonly used in the regulation of the flow of milk and other food products through sanitary conduits or piping.

In valves of the type comprising the subject matter of this invention which are intended for use in the handling of food products, it is highly desirable to construct a valve incorporating sanitary features and using the least possible number of working parts. In such a construction it is desirable to have the valve element easily removable from the valve casing so that the operating elements may be easily cleaned. The packing elements used in sealing the entrance aperture for the valve stem should also be easily accessible for cleaning. The accompanying drawing illustrates a sanitary valve of this type; however, the invention is not to be limited to the specific embodiment disclosed.

The principal object of this invention is to provide a valve of simple, sanitary design in which all parts of the valve casing, packing elements and operative valve elements are freely accessible for cleaning, in which the valve elements may be easily and quickly removed from the casing and the packing elements made freely accessible, in which all of the above may be accomplished by the removal of one union or nut, in which, by the tightening of a single union or nut, the valve elements are operatively supported and sealed within the valve casing, and in which all parts of the interior of the valve casing and the operative elements of the valve structure exposed to the fluid flowing through the valve are free of crevices or grooves which may be difficult to clean.

Other advantages of the invention will be apparent from the following description when read in connection with the accompanying drawing in which is shown a vertical sectional view of a valve and casing and co-acting parts in accordance with the invention.

Referring to the drawing showing the invention in its preferred form, I designates a valve casing consisting substantially, with the exception of detailed modifications to adapt it for use as a valve casing, of a sanitary fitting commonly referred to as a cross. The casing I is provided with intercepting or traversing passages 2 and 3 which, in the particular illustration shown, are at right angles to each other having inwardly beveled coupling element seats 4 at each end of each passage and screw threads 5 on the outer periphery of the casing I about the ends of the passages 2 and 3 which cooperate with union nuts 6 having inwardly extended flanges 7 used for the securing of coupling elements (not shown) to the end of the passages 2 and 3. The unions 6 are also used for the sealing of a standard closure cap (not shown) to the ends of the passages 2 and 3 to seal the same when it is not desired to connect it to a conduit.

One branch of the passage 2 is provided with an enlarged, cylindrical face 8 adjacent the beveled face 4 at that end of the passage 2 resulting in a countersunk shoulder 9 at the point of juncture of the face 8 and the normal inner face of the passage 2. A special passage closure cap 10 is provided with a beveled outer face 11 complementary to the beveled face 4 at the end of the passage 2 and a cylindrical face 27 complementary to the cylindrical face 8 to seal the cap to the end of the passage 2 and properly center the same in said passage by the tightening of the union 6. The inwardly directed flange of the union 6 co-acts with the offset ledge 12 on the outer face of the cap 10 to compress the same into sealing and centering position.

A centrally positioned shank 13 on the upper surface of the cap 10 is provided with a central aperture 14 extending therethrough and through the closure cap 10 with which cap the shank 13 is integrally formed. The walls of the aperture 14 engage a valve stem 15 in a bearing contact throughout the entire length of the aperture. The end of the valve stem 15 extending from the apertured shank and outwardly of the valve casing is provided in a conventional manner with a removable handwheel or handle 16 having a centrally positioned, laterally apertured, depending bonnet 17, as shown, provided with internal threads 18 accessible for cleaning through the lateral apertures, which threads 18 engage complementary threads 19 on the outer periphery of the apertured shank 13. By the adjustment of the handwheel 16, the engagement of the complementary threads 18 and 19 will enable the desired movement of the valve stem 15.

To seal the inner end of the aperture 14 I provide an annular, compressible gasket 20 encompassing the valve stem 15 intermediate the inner face of the cap 10 and a centrally apertured diaphragm 21 telescoped over the valve stem 15 and seated on the countersunk shoulder 9. Upon the tightening of the union 6 the gasket 20 will be compressed between the adjacent faces of the cap 10 and the diaphragm 21. To assure the proper sealing of the gasket against the valve stem 15 an inwardly beveled surface 28 at the inner end of the aperture 14 is provided to co-act with the compressible gasket 20 and exert thereon a compressive force urging the gasket toward and into intimate contact with the outer surface of the valve stem 15.

At the inner end of the valve stem a valve element 22 is provided, the valving face of which is in the shape of a frustum of a cone. The valve element 22 is adapted, upon proper adjustment of the valve stem, to seat against a complementary valve seat 23 provided in the valve casing 1 at the point of juncture of the passage 3 and the inner end of the branch of passage 2 opposite that branch of the passage adapted to be sealed to cap 10.

It is to be noted that the valve element 22 is smaller in diameter than the passage 2 intermediate the valve element 22 and the cap 10 whereby, upon the loosening of the union 6, the cap 10 and the entire associated valve mechanism comprising the stem 15, apertured diaphragm 21 and gasket 20 will be easily removed for cleaning from the valve casing 1 through that portion of the passage 2 adapted to be sealed to the cap 10.

To provide a seat for the valve element 22 in a passage normally of larger diameter than the valve element, the passage is provided with a restricted throat 24, the inner end of which in turn is beveled to constitute a valve seat 23 complementary to the conical surface of the valve element 22 and positioned at the point of juncture of the restricted throat 24 and the intercepting passage 3.

To limit the possible movement of the valve element 22 away from the valve seat 23 when the mechanism is assembled, the valve stem 15 is provided with an annular shoulder 25 on its outer periphery intermediate the valve element 22 and the normal operative position of the diaphragm 21 when the valve mechanism is assembled. The shoulder 25 is of larger diameter than the aperture in the diaphragm 21 whereby, upon the adjustment of the valve stem 15 by the manipulation of the handwheel 16, the movement of the stem will be limited in one direction by the engagement of the valve 22 with the valve seat 23 and limited in the other direction by the engagement of the shoulder 25 with the diaphragm 21.

Assuming the various elements of the valve mechanism to be in disassembled order it is necessary, in assembling the same, to telescope the diaphragm 21, the gasket 20 and the apertured cap 10 over the valve stem 15 in the order as mentioned. The union 6 is then telescoped over the shank 13 and cap 10 until the ledge 7 engages the shoulder 12 and the assembly is then inserted into position on the enlarged end of the passage 2 until the valve element 22 contacts the valve seat 23. Upon the tightening of the union nut 6 on the threaded outer periphery of the valve casing enclosing the respective end of the passage 2 the proper seating and centering of the beveled face 11 of the cap 10 and the complementary cylindrical surfaces 8 and 27 will be secured. The threaded bonnet 17 of the handwheel 16 is next threaded over the apertured shank 13 until the handwheel 16 engages the end of the valve stem 15 in locking engagement wherupon it is then fixed to the stem 15 by tightening the nut 26 upon the threaded outer end 29 of the stem 15, which threaded end extends through the handwheel 16.

It will, of course, be readily understood that the herein described valve is particularly adapted for sanitary use in which it must be frequently cleaned. However, it is also well adapted for other uses in which it is not necessary to frequently clean the same. The improved unit is simple in construction. It involves the use of few working parts, all of which can be easily cleaned and are quickly made accessible for cleaning by the dismantling of the valve which can be done by the loosening of one union. With this particular arrangement of parts all unsanitary crevices and grooves have been eliminated from the valve structure as well as all unsanitary packings which normally are not freely accessible in valve structures.

In this construction a single element is used to constitute a bearing and guide for the valve stem, a closure cap for the end of a fluid passage and a compression element to compress the seal when the mechanism is operatively assembled. The above construction has all been conveniently adapted, with a few minor changes, to the conventional sanitary fitting known as a cross thereby clearly simplifying the construction normally necessary in the fabrication of a valve of this type.

It will, of course, be understood that the various changes in materials, details and arrangement of the elements of the valve which have here been described and illustrated to explain the invention may be made by those skilled in the art within the scope of the invention as set forth in the appended claims.

The invention is hereby claimed as follows:

1. A valve comprising, in combination, a valve casing having a passage through the wall thereof, a valve seat in said casing, a valve element adapted to sealingly engage said valve seat and adapted for movement in said casing, an apertured passage cap adapted to be removably supported on said casing, said aperture in said cap having its inner end flared, a valve stem for moving said valve element, said valve stem extending into said casing through said apertured cap, a ported diaphragm encircling said valve stem and supported by said casing, said valve element and ported diaphragm being movable into and out of said valve casing through the passage in the wall of said casing through which said valve stem extends, and a resilient gasket element engaging said ported diaphragm and encompassing said valve stem intermediate said diaphragm and the flared end of the aperture in said apertured cap and being adapted to be forced into sealing engagement with said valve stem when said apertured cap is placed in operative position on said casing.

2. A valve comprising, in combination, an apertured valve casing, a valve seat in said casing, a valve element adapted to sealingly engage said valve seat and adapted for movement in said casing, an apertured passage cap adapted to be removably supported on said casing within the aperture therein, said aperture in said cap having its inner end flared, a unitary valve stem for supporting and moving said valve element integrally formed therewith, said stem extending into said casing through said apertured cap positioned over the aperture in said valve casing, screw threads on the outer periphery of said apertured cap, a handwheel carried on the free end of said valve stem extending out of said apertured cap and having an internally threaded bonnet in threaded engagement with said screw-threaded outer periphery of the apertured cap, a countersunk shoulder in said apertured casing concentric with and adjacent to the cap engaging end thereof, a ported diaphragm encircling said stem and supported upon said shoulder within said valve casing, said valve element and ported diaphragm being movable into and out of said valve casing through the aperture therein through which said valve stem extends, and a resilient, unitary gasket element engaging said ported diaphragm and encircling said valve stem intermediate said diaphragm and the inner flared end of the aperture in said apertured cap and adapted to be forced into sealing engagement with said stem, with said apertured cap and with said ported diaphragm when said apertured cap and diaphragm are in operative position.

3. A valve comprising, in combination, an apertured valve casing, a valve seat in said casing, a valve element adapted to sealingly engage said valve seat and adapted for movement in said casing, an apertured passage cap adapted to be removably supported in sealing engagement on said casing to close the aperture therein, said aperture in said cap having its inner end flared, a unitary valve stem for supporting and moving said valve element formed integrally therewith, said stem extending into said casing through said apertured cap positioned over the aperture in said valve casing, screw threads on the outer periphery of said apertured cap, a handwheel carried on the free end of said valve stem extending out of said apertured cap and having an internally threaded bonnet in threaded engagement with said screw-threaded outer periphery of the apertured cap, a countersunk shoulder in said casing concentric with and adjacent to the cap engaging portion of said apertured casing, a ported diaphragm encircling said stem and supported by said shoulder within said valve casing, said valve element and ported diaphragm being movable into and out of said valve casing through the aperture therein through which said valve stem extends, and a resilient, unitary gasket element engaging said ported diaphragm and encircling said valve stem intermediate said diaphragm and the inner flared end of the aperture in said apertured cap and adapted to be forced into sealing engagement with said stem, with said inner flared end of the aperture in said apertured cap and with said ported diaphragm upon the pressing of said passage cap into operative position above said diaphragm.

4. A valve comprising, in combination, an apertured valve casing, a valve seat in said casing, a valve element adapted to sealingly engage said valve seat and adapted for movement in said casing, an apertured passage cap adapted to be removably supported in sealing engagement on said casing by engaging a bevelled portion defining an aperture therein, said aperture in said cap having its inner end flared, a unitary valve stem for supporting and moving said valve element formed integrally therewith, said stem extending into said casing through said apertured cap positioned over the aperture in said valve casing, screw threads on the outer periphery of said apertured cap, a handwheel carried on the free end of said valve stem extending out of said apertured cap and having an internally threaded bonnet in threaded engagement with said screw-threaded outer periphery of the apertured cap, a countersunk shoulder in said casing concentric with and adjacent to said cap engaging bevelled portion, a ported diaphragm encircling said stem and supported in said valve casing upon said shoulder, said valve element and ported diaphragm being movable into and out of said valve casing through the aperture therein through which said valve stem extends, a resilient, unitary gasket element engaging said ported diaphragm and encircling said valve stem intermediate said diaphragm and the inner flared end of the aperture in said apertured cap and adapted by said inner flared end to be forced into sealing engagement with said stem, with said apertured cap and with said ported diaphragm, and a shoulder on said valve stem intermediate said valve element and said apertured diaphragm of greater diameter than the aperture in said diaphragm and of smaller diameter than said valve whereby to limit the motion of said valve stem when said valve is opened.

5. In a device of the class described, an apertured valve casing, an annular valve seat in said casing, a valve element adapted to sealingly engage said valve seat and adapted for movement in said casing, an apertured passage cap having a beveled shoulder and adapted to be removably supported in sealing engagement on said casing, said aperture in said cap having its inner end flared, a unitary valve stem for supporting and moving said valve element formed integrally therewith, said stem extending into said casing through said apertured cap positioned over the aperture in said valve casing and being adapted to move said valve within said casing, a screw thread on the outer periphery of said apertured cap, a handwheel carried on the free end of said valve stem extending outwardly of said valve casing and having an internally threaded bonnet in threaded engagement with the outer threaded periphery of said apertured cap, a countersunk shoulder in said casing concentric with and adjacent to the cap, a ported diaphragm encircling said stem and supported upon said countersunk shoulder, said valve element and ported diaphragm being movable into and out of said valve casing through the aperture therein through which said valve stem extends, and a resilient, unitary gasket element adapted by said inner flared end of the aperture in said cap to be forced into sealing engagement with said stem and encompass said stem intermediate the inner flared end of said cap and said diaphragm, said beveled shoulder on said apertured cap being so constructed and arranged as to centeringly and sealingly engage a complementary beveled face in the apertured casing.

6. A valve comprising, in combination, an apertured valve casing, an apertured passage cap for sealing engagement about an aperture in said casing, a valve seat in said casing, a valve element adapted to sealingly engage said valve seat and adapted for movement in said casing, a shoulder on said apertured passage cap and a complementary shoulder on said casing for limiting the motion of said apertured passage cap toward said casing when said apertured passage cap is assembled into operative position, said apertured passage cap being so constructed as to secure centering and bearing contact between said apertured passage cap and the engaged inner face of the aperture in said casing with which it is associated, a valve stem extending into said casing through said apertured passage cap positioned over the aperture in said valve casing for supporting and moving said valve element, said valve stem being in bearing, alining and centering contact with the inner surface of the aperture in said apertured passage cap, a ported diaphragm encircling said valve stem and supported by said valve casing, said valve element and ported diaphragm being movable into and out of said valve casing through the aperture therein through which said valve stem extends, and a resilient gasket element encompassing said valve stem intermediate said ported diaphragm and the inner end of said apertured passage cap, said resilient gasket being adapted to be forced into sealing engagement with said valve stem, said ported diaphragm and said apertured passage cap, said shoulder on said apertured passage cap being of a lesser distance from the inner end of the apertured passage cap than said complementary shoulder on said casing is from the adjacent surface of said ported diaphragm, whereby the possible compression of said resilient gasket when said apertured passage cap is assembled into operative position is automatically limited.

7. A valve comprising, in combination, an apertured valve casing having a beveled opening to receive a passage cap, a valve seat in said casing, a valve element adapted to sealingly engage said valve seat and adapted for movement in said casing, an apertured passage cap having a beveled shoulder and adapted to be removably supported and to sealingly engage the beveled opening in said casing and having a cylindrical face extending into said casing in centering and bearing contact with the inner face of said opening, said aperture in said cap having its inner end flared, a unitary valve stem extending into said casing through said apertured cap for supporting and moving said valve element, said valve stem having its outer surface in bearing, alining and centering contact with the inner surface of the aperture in said passage cap, whereby said valve is centered and maintained in alinement with said valve seat, a ported diaphragm encircling said valve stem and supported by said valve casing, said valve element and ported diaphragm being movable into and out of said valve casing through the aperture therein through which said valve stem extends, and a resilient gasket element engaging said ported diaphragm and encompassing said stem intermediate said diaphragm and the inner flared end of the aperture in said apertured cap and adapted by said inner flared end to be forced into sealing engagement with said stem, said beveled shoulder on said apertured cap being of a lesser distance from the inner end of said cap than the beveled face of the end of said opening in said casing is from the adjacent surface of the apertured diaphragm resting on a countersunk shoulder support in said casing, whereby the possible compression of said resilient gasket element when said passage cap is in operative position is automatically limited.

CHARLES B. DALZELL.
HAROLD W. CHENEY.